R. MILLER AND S. C. ICKE.
TOOL HOLDER FOR LATHES, SHAPING, PLANING, AND OTHER LIKE MACHINES.
APPLICATION FILED MAR. 26, 1920.

1,405,714. Patented Feb. 7, 1922.

Inventors
Ralph Miller and
Stanley Charles Icke.
By B. Singer. Atty

UNITED STATES PATENT OFFICE.

RALPH MILLER, OF BIRMINGHAM, AND STANLEY CHARLES ICKE, OF ACOCKS GREEN, NEAR BIRMINGHAM, ENGLAND.

TOOL HOLDER FOR LATHES, SHAPING, PLANING, AND OTHER LIKE MACHINES.

1,405,714.      Specification of Letters Patent.     Patented Feb. 7, 1922.

Application filed March 26, 1920. Serial No. 369,042.

*To all whom it may concern:*

Be it known that we, RALPH MILLER, of 35 Grove Road, Sparkhill, Birmingham, in the county of Warwick, England, and STANLEY CHARLES ICKE, of 24 Westfield Road, Acocks Green, near Birmingham, in the county of Warwick, England, both subjects of the Kingdom of Great Britain, have jointly invented certain new and useful Improvements in or Relating to Tool Holders for Lathes, Shaping, Planing, and other like Machines, of which the following is a specification.

This invention comprises certain improvements in or relating to tool holders for lathes, shaping, planing and other like machines, and has among its objects to facilitate the assembling of the cutting element within the holder, to enable the cutting element to be secured in position within the holder in a more expeditious and simple manner than heretofore, to reduce the number of parts or elements required for securing the tool in position, and to generally improve the construction and arrangement of the holder.

According to the present invention a tool holder is provided in which the cutting element is secured in position within the holder by the action of securing the holder in the machine for receiving same.

The operation of tightening up that member or part furnished for fixing the tool holder in the position within the machine is caused to effect the secure fixing of the cutting element or tool within the holder through the medium of an intermediary part or element adapted to be associated with or assembled within the holder and to have a bearing upon said cutting element or tool, the release of the tool holder fixing member or part also effecting the release of the tool.

In order that this invention may be clearly understood and readily carried into practice, reference may be had to the appended explanatory sheet of drawings, upon which:—

Figure 1:
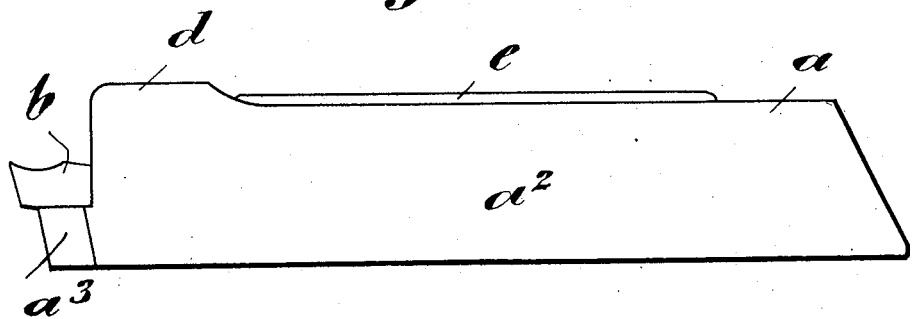
Figure 1 illustrates in side elevation a tool holder according to the present invention.
Figure 2:
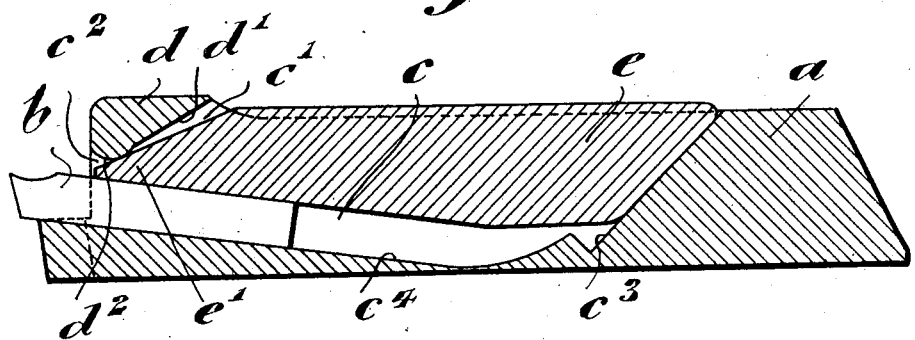
Figure 2 is a longitudinal section through the holder.
Figure 3:
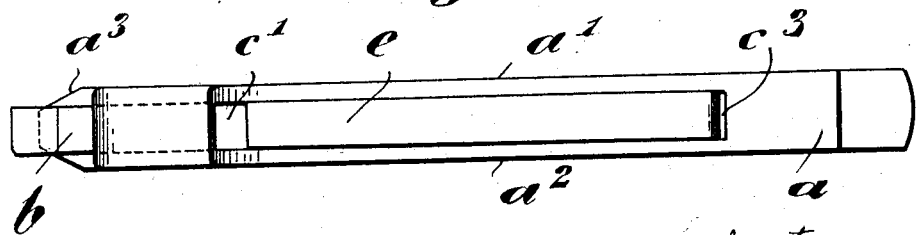
Figure 3 is a plan of same.

In a convenient embodiment of the present invention the tool holder $a$ is constructed from suitable metal of rectangular or other formation, two of the side faces of which are advantageously of greater width than the remaining side faces. The required tool $b$ is adapted to be inserted within the one end of the holder $a$ while the opposite end is adapted to be secured in position within the machine to which the tool is required to be fitted. For convenience of description, that end of the holder from which the cutting element projects will be termed the front of the holder, and the opposite end will be termed the rear, while the oppositely disposed narrower sides will be termed the upper and lower sides or faces. It will, however, be readily understood that the disposition of the holder is varied according to the type of machine to which same is fitted and the work to be accomplished.

A centrally disposed longitudinal elongated recess $c$ is cut or formed within the holder $a$, such recess opening out at the upper face of the tool holder, so as to form said tool holder with two parallelly disposed vertical side walls $a^1$, $a^2$. The forward end of the recess is wedge-shaped or tapered at $c^1$ and opens out at the front at $c^2$, while the rear wall $c^3$ inclines rearwardly from the bottom of the recess to the upper side of the holder, the angle of such incline being comparatively steep. The base $c^4$ of the recess slopes gradually downwards from the mouth $c^2$ to the rear thereof, and the cutting element $b$ to be fitted within the holder $a$ is assembled at the mouth $c^2$ and is adapted to bear upon the inclined base $c^4$ of said recess so as to project out from the holder at the desired angular position for working. Extending laterally across the upper forward part of the holder is an integral bridge piece $d$ of substantially triangular formation, located above the mouth $c^2$ from which the cutting element projects.

Adapted to be inserted into the recess $c$ in the tool holder and bear upon the upper face or part of the tool $b$ is a suitable wedge member $e$, the shape and size of said wedge being substantially the same as that of the recess above the tool, that is to say said wedge $e$ is of substantially rectangular formation in cross section, having a horizontal upper face, a gradually inclined lower face corresponding with the incline of the tool when in position, a sharp inclined rear face and a tapered or wedge shaped front portion or nose $e^1$. The forward wedge shaped or tapered nose $e^1$ is adapted to project into the front tapered portion $c^1$ of the recess $c$, the upper inclined face of the wedge nose $e^1$ being adapted to bear on a suitable part of the lower inclined face $d^1$ of the bridge portion $d$ at the front of the holder so as to have a fulcrum section thereon. Advantageously the fulcrum is provided by forming the lower inclined face $d^1$ of the bridge piece $d$ somewhat steeper than the upper inclined face of the wedge nose portion $e^1$, and forming a bulged or curved projecting piece $d^2$ at the lower face of the bridge piece, such bulged or curved portion constituting the fulcrum.

In the operation of fixing the tool holder with cutting element within the required machine, the tool $b$ is inserted within the holder $a$ so as to project to the desired extent therefrom, and the wedge $e$ is inserted above same within the recess, and with the parts in this position the whole is inserted within the machine in the usual manner by tightening up the screw member or part carried by the machine part to receive the holder. The action of screwing up or tightening the holder in position has the effect of pressing or tending to press the wedge member $e$ farther into the recess $c$ within the holder $a$, and by reason of the rear inclined formation of the wedge and recess, said wedge is adapted to fulcrum upon the under projecting part $d^2$ of the bridge piece $d$ and thereby securely grip the tool $b$ in position.

By the employment of a holder according to this invention no pin, screw member or equivalent projecting element is disposed at the front end of the holder, thereby a clear and unobstructed vision is obtained to the work.

A tapered extension or projecting piece $a^3$ may be provided at the forward extremity of the tool holder $a$ beneath the projecting tool $b$ so as to afford an effective support therefor.

What we claim as our invention, and desire to secure by Letters Patent is:—

1. A tool holder, suitable for lathes, shaping, planing or other machines, involving or including a fixing member having a wedge-shaped nose or extremity which is adapted to operate between the cutting tool within the holder and a fixed part of the latter member, the fixing member being provided with an inclined face at its rear extremity adapted to co-act with a corresponding inclined face provided within the holder so that in the tightening operation of the holder the said fixing member is caused to move longitudinally on account of the inclined co-acting faces to operate the wedge-shaped nose, for the purpose set forth.

2. A tool holder as claimed in the foregoing claim, in which the wedge-shaped nose or fixing member is accommodated within an aperture in the front part of the holder, said aperture involving a bridge portion having an inclined lower face against a suitable curved part of which the upper face of the nose is adapted to bear so as to have a small fulcrum thereon.

In witness whereof we have hereunto set our hands.

RALPH MILLER.
STANLEY CHARLES ICKE.